United States Patent
Bahlke et al.

(10) Patent No.: US 9,213,620 B2
(45) Date of Patent: Dec. 15, 2015

(54) METHOD AND SYSTEM FOR MONITORING MESSAGE OBJECTS SENT FROM A CLIENT TO INVOKE OPERATIONS ON A SERVER IN A DISTRIBUTED COMPUTING ENVIRONMENT

(75) Inventors: Rolf Bahlke, Darmstadt (DE); Guido Trensch, Alsbach (DE); Wolfgang Schmidt, Zwingenberg (DE)

(73) Assignee: SOFTWARE AG, Darmstadt (DE)

( * ) Notice: Subject to any disclaimer, the term of this patent is extended or adjusted under 35 U.S.C. 154(b) by 0 days.

(21) Appl. No.: 13/307,376

(22) Filed: Nov. 30, 2011

(65) Prior Publication Data

US 2013/0110908 A1 May 2, 2013

(30) Foreign Application Priority Data

Nov. 2, 2011 (EP) .................................... 11187474

(51) Int. Cl.
*G06F 15/16* (2006.01)
*G06F 11/34* (2006.01)
*G06F 9/54* (2006.01)
*G06F 11/30* (2006.01)
*H04L 29/08* (2006.01)
*H04L 12/26* (2006.01)

(52) U.S. Cl.
CPC ............ *G06F 11/3476* (2013.01); *G06F 9/546* (2013.01); *G06F 11/302* (2013.01); *G06F 11/3006* (2013.01); *G06F 11/3065* (2013.01); *G06F 11/3409* (2013.01); *G06F 11/3495* (2013.01); *H04L 43/10* (2013.01); *H04L 67/10* (2013.01); *H04L 43/0852* (2013.01)

(58) Field of Classification Search
CPC ..... H04L 65/10; H04L 43/0852; H04L 65/80; H04L 51/18; H04B 10/0775; H04W 24/00
USPC .......................................... 709/203, 223–224
See application file for complete search history.

(56) References Cited

U.S. PATENT DOCUMENTS

| | | | | |
|---|---|---|---|---|
| 2002/0198990 A1* | 12/2002 | Bradfield et al. | ............. | 709/224 |
| 2003/0053486 A1* | 3/2003 | Okamori | ........................ | 370/474 |
| 2006/0221837 A1* | 10/2006 | Gardner et al. | ............... | 370/241 |
| 2006/0250988 A1* | 11/2006 | Garcia et al. | .................. | 370/260 |
| 2006/0265365 A1* | 11/2006 | Chkodrov et al. | ................. | 707/3 |
| 2007/0064686 A1* | 3/2007 | Bae et al. | ....................... | 370/356 |
| 2008/0114847 A1* | 5/2008 | Ma et al. | ........................ | 709/206 |

(Continued)

FOREIGN PATENT DOCUMENTS

| | | |
|---|---|---|
| DE | 20 2006 003 832 | 8/2006 |
| EP | 1 710 976 | 10/2006 |
| EP | 1710976 A1 * | 10/2006 |

OTHER PUBLICATIONS

Treehouse Software Incorporated, Treehouse Products and Services webpage (available at http://www.treehouse.com/tsiprod.shtml) [retrieved on Nov. 29, 2011].
ASG Software Solutions, ASG-TMON for WebSphere MQ (available at http://asg.com/Products/View/ASG-TMON-for-WebSphere-MQ/ASG-TMON-for-WebSphere-MQ-Data-Sheet.aspx) [retrieved on Nov. 29, 2011].
CA, CA Insight Database Performance Monitor for Distributed Databases (available at http://www.ca.com/files/productbriefs/insight_db_monitor_dist_product_brief.pdf) [retrieved on Nov. 29, 2011].
SM-BOX "Product" Appliance webpage (with machine translation) (original available at http://www.systemmonitoring.de/produkt/appliance.html) [retrieved on Nov. 29, 2011].

(Continued)

*Primary Examiner* — Waseem Ashraf
(74) *Attorney, Agent, or Firm* — Nixon & Vanderhye PC

(57) ABSTRACT

Certain example embodiments relate to a method of monitoring a message object sent from a client to invoke an operation on a server in a distributed computing environment. Upon receipt of the message object at a measurement point, measurement data is produced. The measurement data is inserted into the message object.

27 Claims, 8 Drawing Sheets

(56) References Cited

U.S. PATENT DOCUMENTS

Figure 1:
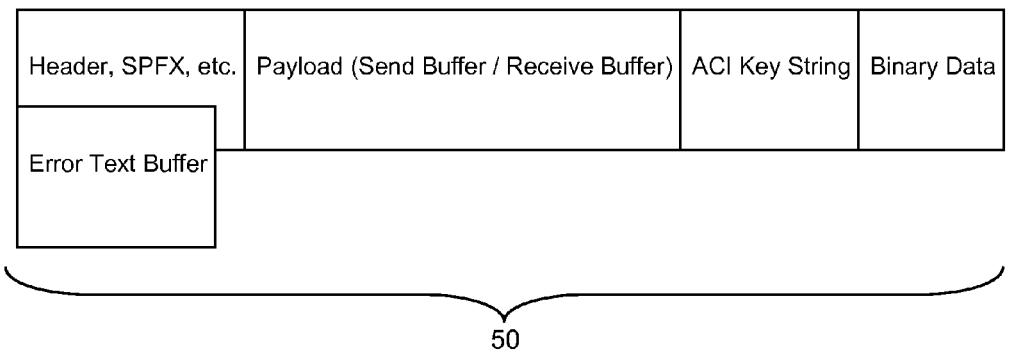

| | | | |
|---|---|---|---|
| 2008/0159287 A1* | 7/2008 | Nagarajan et al. | 370/392 |
| 2009/0147731 A1* | 6/2009 | Chion et al. | 370/328 |
| 2009/0328186 A1* | 12/2009 | Pollutro et al. | 726/13 |
| 2010/0105416 A1* | 4/2010 | Nadler et al. | 455/456.4 |
| 2010/0189044 A1* | 7/2010 | Roy et al. | 370/328 |
| 2011/0246641 A1* | 10/2011 | Pugh et al. | 709/224 |
| 2012/0054341 A1* | 3/2012 | Donaghey et al. | 709/224 |

OTHER PUBLICATIONS

Nagios webpage (available at http://www.nagios.com/) [retrieved on Nov. 29, 2011].

* cited by examiner

Fig. 4

Measurement Data are Component specific Key Value Pairs

| LL, Payload Extension (Measurement Data) |
|---|

~100

```
Example Measurement Data Format (a time value)

/* Measurement Point String Format P_TIMEVAL            LEN  */
/*                                                           */
/* EXXBRKCIMT=1234567890123456,                              */
/* |--||----||--------||-||------||---|                      */
/*   |    |      |     |     |      |                        */
/*   |    |      |     |     |      +--- Delimiter       1   */
/*   |    |      |     |     +---------- Micro Seconds   6   */
/*   |    |      |     +---------------- Seconds         10  */
/*   |    |      +---------------------- Separator       1   */
/*   |    +----------------------------- Datatype (TimeVal) 1 */
/*   +---------------------------------- MPoint Name     6   */
/*        +----------------------------- Product Key     3   */
/*                                                           */
/*   +---------------------------------- MPoint Key      10  */
```

| MeasurementPoint1=MeasurementData,MeasurementPoint2=MeasurementData,..... |
|---|

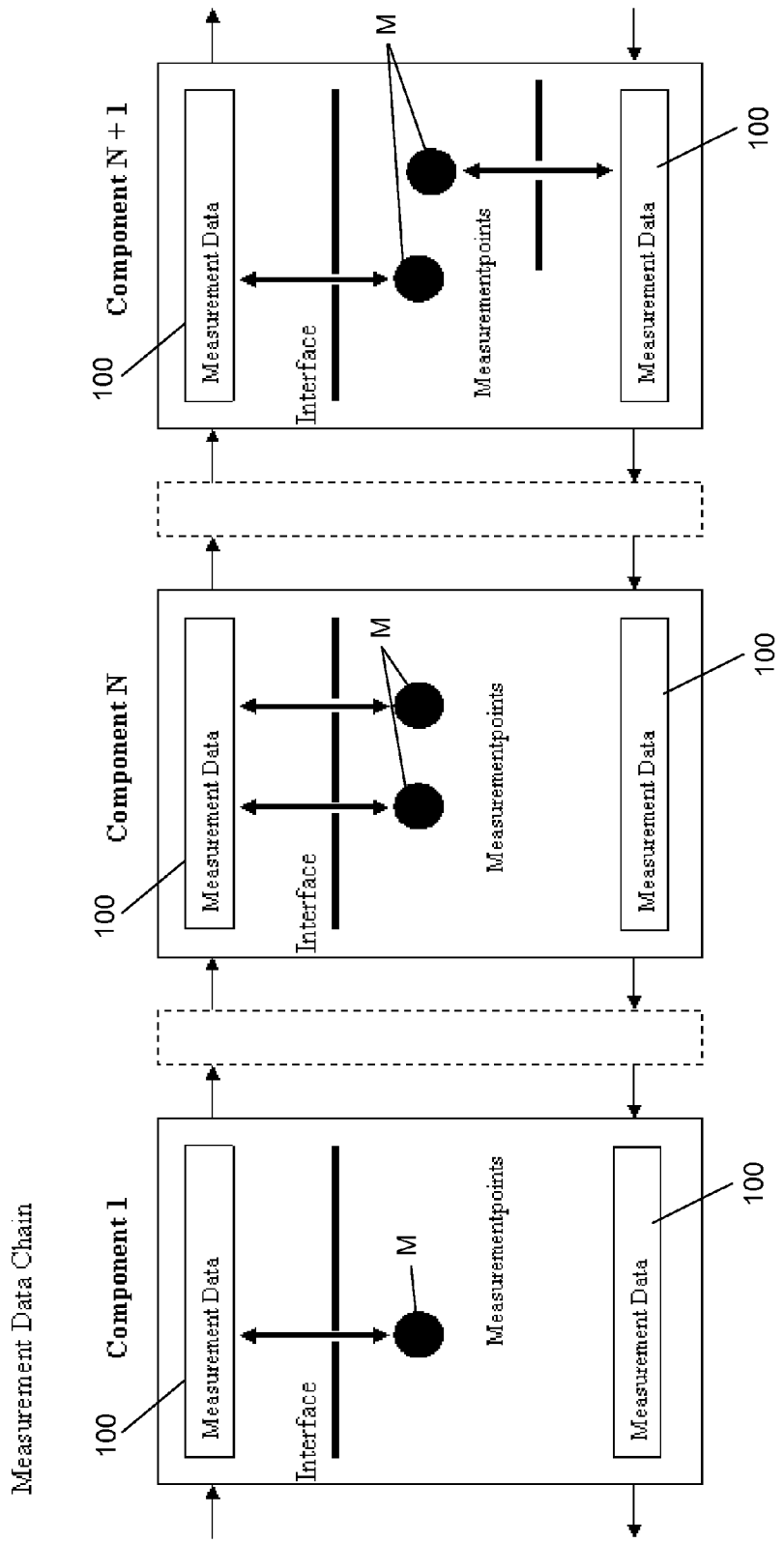

Fig. 8

```
1) Measuring Point Format P_TIMEVAL

EXXBRKCLIENTINCT=1234567890123456,
|-||--|-------||||--------||----||
 |  |    |    ||    |     |    |                                   LEN
 |  |    |    ||    |     |    +-- Delimiter                        1
 |  |    |    ||    |     +------ Micro Seconds                     6
 |  |    |    ||    +------------ Seconds                          10
 |  |    |    |+---------------- Separator                          1
 |  |    |    +----------------- Datatype (TimeVal)                 1
 |  |    +---------------------- Item           NNNNNNNNN           9
 |  +--------------------------- Component      CCC                 3
 +------------------------------ Product Code   PPP                 3
 |--------------|
                |
                +-------------- MPoint Key                         16

2) Measuring Point Format (P_MICROSECONDS)
   It has a variable length.

EXXBRKCLIENTDURM=nnn1234,
|-||--|-------||||-----||
 |  |    |    ||   |   |                                           LEN
 |  |    |    ||   |   +---------- Delimiter                        1
 |  |    |    ||   +-------------- Micro Seconds                    n
 |  |    |    |+----------------- Separator                         1
 |  |    |    +------------------ Datatype (micro seconds)          1
 |  |    +----------------------- Item           NNNNNNNNN          9
 |  +---------------------------- Component      CCC                3
 +------------------------------- Product Code   PPP                3
 |--------------|
                |
                +-------------- MPoint Key                         16

3) Measuring Point String Format
   It has a variable length.

EXXBRKCLIHOSTNAS=hostname,
|-||--|-------||||------||
 |  |    |    ||    |   |                                          LEN
 |  |    |    ||    |   +---------- Delimiter                       1
 |  |    |    ||    +-------------- AppMon data item                n
 |  |    |    |+----------------- Separator                         1
 |  |    |    +------------------ Datatype (string)                 1
 |  |    +----------------------- Item           NNNNNNNNN          9
 |  +---------------------------- Component      CCC                3
 +------------------------------- Product Code   PPP                3
 |--------------|
                |
                +-------------- MPoint Key                         16
```

METHOD AND SYSTEM FOR MONITORING MESSAGE OBJECTS SENT FROM A CLIENT TO INVOKE OPERATIONS ON A SERVER IN A DISTRIBUTED COMPUTING ENVIRONMENT

This application claims priority to EP 11 187 474.9 filed 2 Nov. 2011, the entire contents of each of which are hereby incorporated by reference.

1. TECHNICAL FIELD

The present invention relates to a method and system for monitoring message objects sent from a client to invoke an operation on a server in a distributed computing environment.

2. THE PRIOR ART

Modern distributed computing environments typically comprise various computing components, such as clients, servers and brokers, connected in a network. The computing components communicate by passing messages therebetween, e.g. to invoke operations on a remote computing component or to pass data to the remote component. A conventional message format is shown in FIG. 1 and comprises—among others—message header information and payload data. The header typically stores administrative metadata such as the sender and recipient address, whereas the payload portion of the message contains the actual data to be exchanged.

Monitoring such distributed computing environments is an important and difficult technical task in order to assure that the environment operates as desired. To this end, it may be desirable to collect monitoring/measurement data concerning the operation of individual computing components or the messages produced by the computing components. Such measurement data can then be used to analyse, evaluate and control e.g. performance aspects, network bandwidth usage, or even exceptional runtime situations.

In the prior art, measurement data is typically obtained from each computing component and stored in a central log or other memory means for later aggregation, evaluation and analysis. Typically, the collected data is forwarded to a dedicated data collector in charge of storing and analyzing the data. Known monitoring tools adhering to this central measurement data collection scheme are e.g. "Adabas Natural Monitor" of Treehouse, "TMON" of IBM, "Insight Database Performance Monitor" of CA Technologies, "System Monitoring Appliance" of SHD GmbH and "Nagios" of Nagios Enterprises.

However, the known monitoring approaches introduce a level of complexity that might cause problems in distributed environments. For example, collecting measurement data in a central place requires to remember a unique identification in order to build a link between the exchanged monitored messages and the measurement data. In addition to that, the measurement data have to be sent from the various monitored computing components to the central data collector. This introduces extra communication, which not only consumes valuable network bandwidth, but may even obscure a proper performance analysis of the environment due to the additional messaging overhead.

It is therefore the technical problem underlying the present invention to provide an improved way of monitoring messages exchanged between components in a distributed computing environment, thereby at least partly overcoming the above explained disadvantages of the prior art.

3. SUMMARY OF THE INVENTION

This problem is according to one aspect of the invention solved by a method of monitoring a message object sent from a client to invoke an operation on a server in a distributed computing environment. In the embodiment of claim 1, the method comprises the steps of:
a. upon receipt of the message object at a measurement point, producing measurement data; and
b. inserting the measurement data into the message object.

Accordingly, the embodiment defines an approach for monitoring the invocation of operations on a server by a client in a distributed networked computing environment, wherein a client's request for the desired operation is communicated by the client in a message object sent from the client to the server. Monitoring/measuring data is produced and stored within the exchanged message itself. The present method thereby deviates from conventional monitoring approaches in that there is no need for a central log or memory to store the measurement data. Rather, the monitored message is itself used as a container for the measurement data, so that the present method may be particularly employed in an environment without a central monitoring data storage. In addition, the present method avoids additional messages normally sent from the monitored components to the central data storage, so that bandwidth can be saved to a great extent. The measurement data may e.g. comprise information about a delay time, transport time and/or retention time of the message object.

Preferably, the above step of inserting the measurement data into the message object comprises appending the measurement data to measurement data that already exists in the message object. Typically, a message object is passed over multiple computing components in the sense of a messaging chain (such as from a client to a broker and eventually to the desired server, and then back in the inverse direction). In such a scenario, each or at least some of the computing components involved in the messaging chain may add their own measurement data to the message object. In other words, the message object gets more and more extended with measurement data as it travels from one component to the next.

The message object may comprise at least one message extension in which the measurement data is inserted, the at least one message extension being separate from a payload of the message object. Accordingly, the measurement data is stored in the "metadata" portion of the message object, separate from the actual payload portion in order not to distort the actual data to be communicated.

According to a further aspect of the invention, the method comprises the further step of extracting existing measurement data from the message object, wherein the above step of producing measurement data comprises performing at least one calculation on the extracted existing measurement data for producing the measurement data. Accordingly, a computing component, having received a message object, may consume the measurement data already present in the message object (probably produced by a preceding computing component) and correlate the consumed measurement data with its own measurement data. This way, the computing component may base its measuring at least in part on results of preceding components. More generally speaking, the above aspect of consuming measurement data already existing in a received message object enables a computing component to adapt its behavior in accordance with the existing data. For example, one component might add status information about its computing status and/or intermediate results of a certain processing as measurement data into the message object. Accordingly, the next computing component in the message chain might base its behavior on this existing status information/intermediate result.

In yet another aspect, the method comprises the steps of receiving the message object at a message endpoint, and sending the measurement data comprised in the message object to a data collector. Accordingly, once the message object has arrived at its final destination (e.g. the client in a synchronous client-server-call), the collected measurement data is transferred to a data collector for final evaluation and analysis.

As will be apparent to the person skilled in the art, the message object may in more complex environments be passed between at least one client and at least one server over at least one broker in the distributed computing environment, wherein the at least one client, the at least one server and/or the at least one broker comprise at least one respective measurement point for producing measurement data. Accordingly, each component within the computing environment may comprise one or more measurement points, each producing measurement data according to the methods presented above.

The present invention is also directed to a system for monitoring a message object passed between components in a distributed computing environment, wherein the system comprises at least one measurement point, adapted for receiving the message object and for producing measurement data, wherein the at least one measurement point is further adapted for inserting the measurement data into the message object. Further advantageous modifications of embodiments of the system of the invention are defined in further dependent claims. Lastly, the present method provides a computer program comprising instructions for implementing any of the above-described methods.

4. SHORT DESCRIPTION OF THE DRAWINGS

Figure 2:
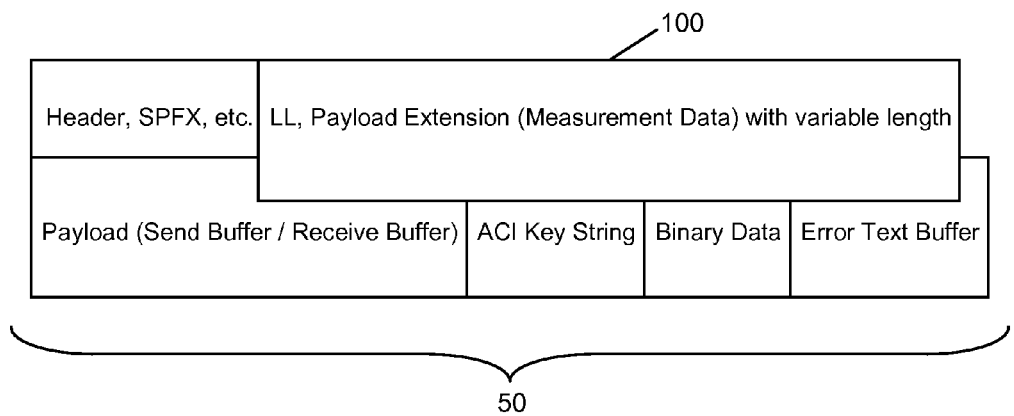
Figure 3:
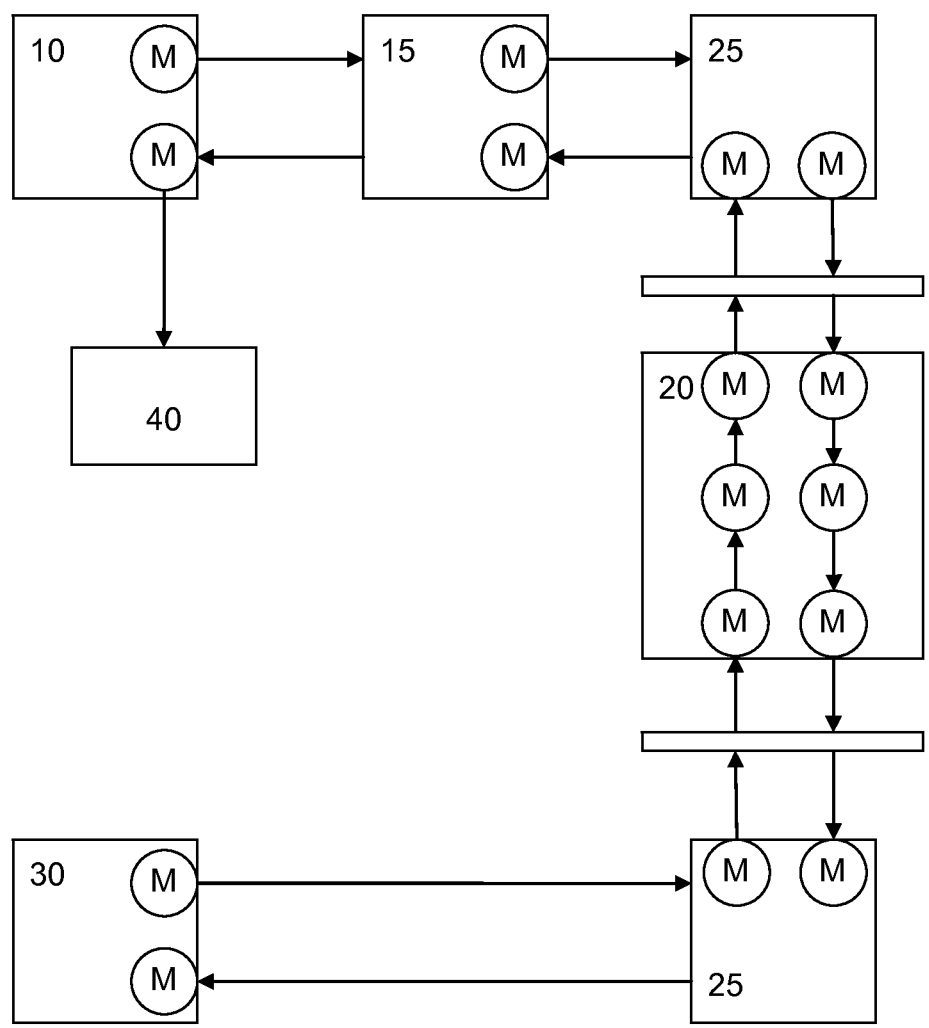
Figure 6:
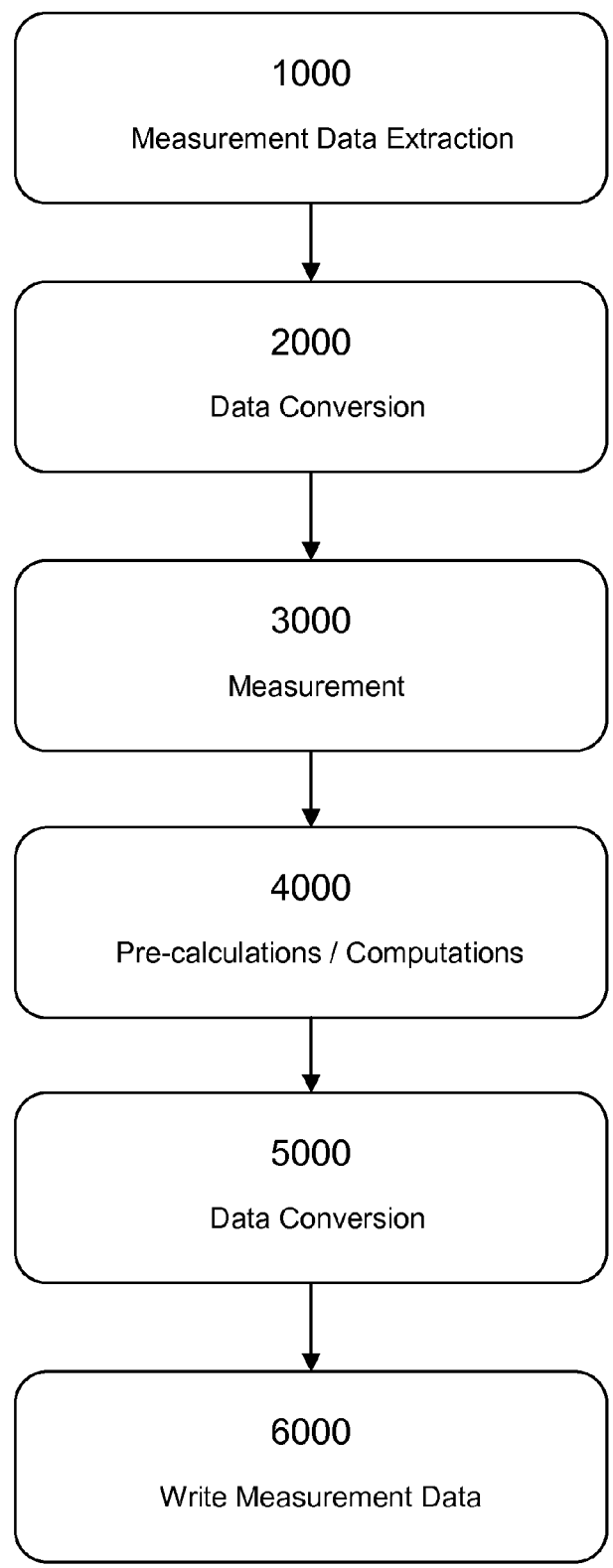
Figure 7:
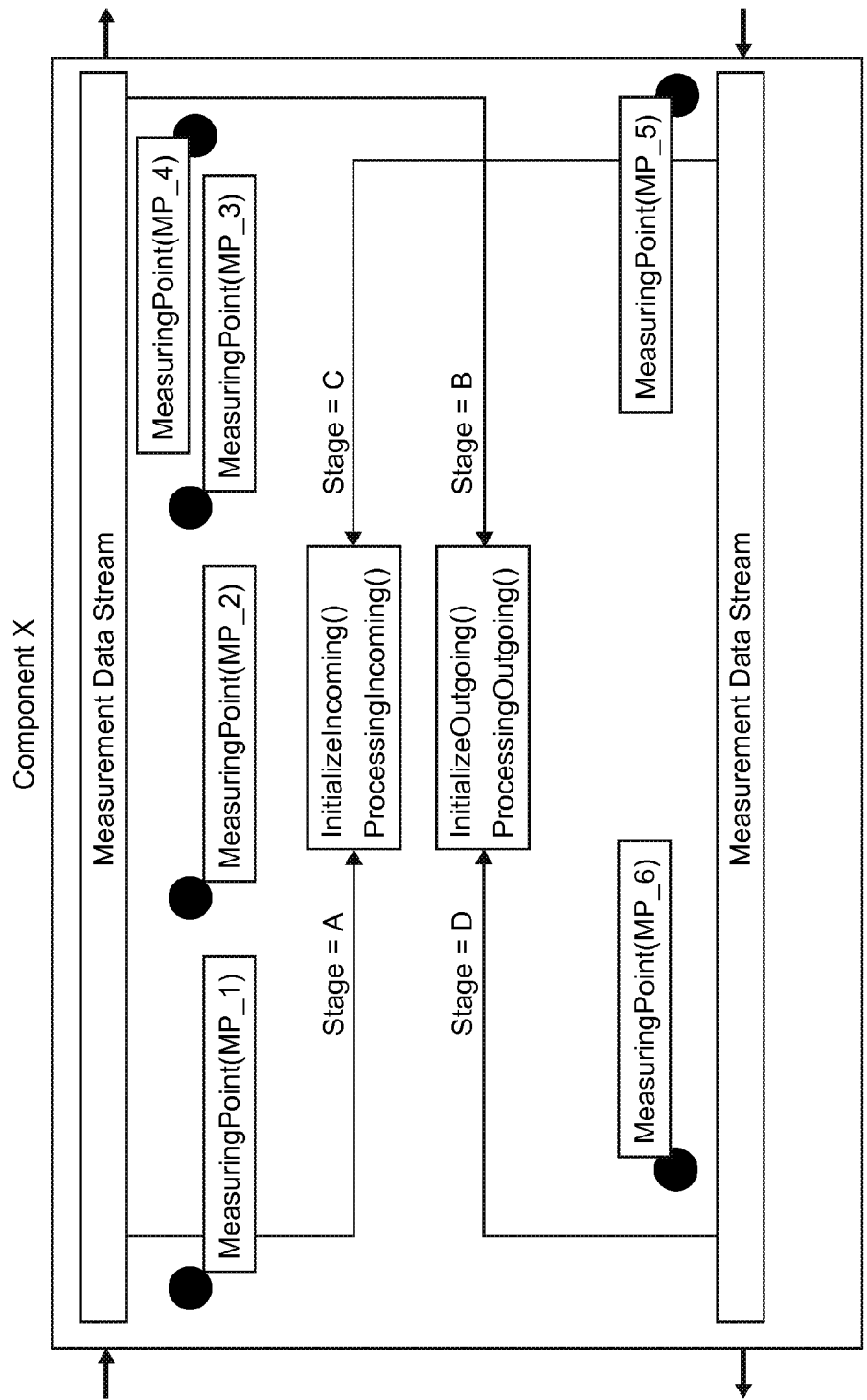
Figure 9:
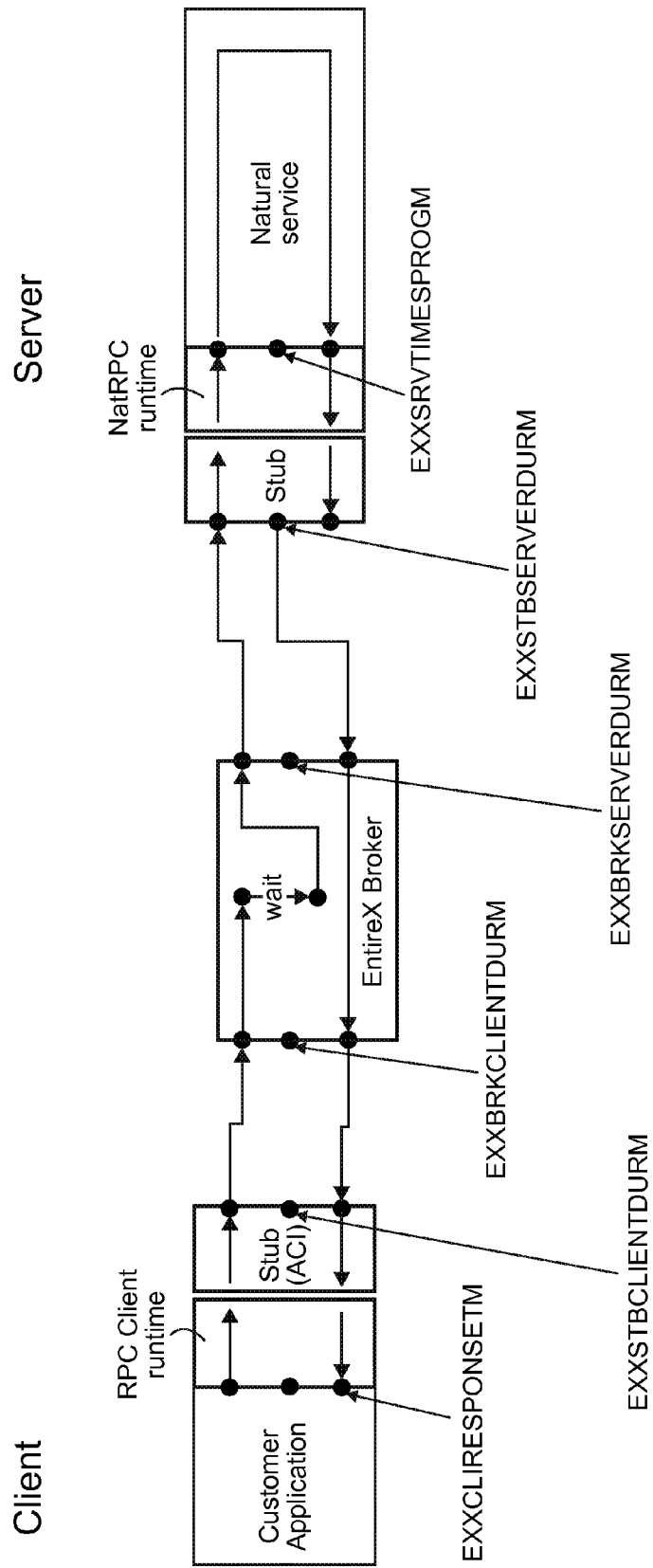

In the following detailed description, presently preferred embodiments of the invention are further described with reference to the following figures:

FIG. 1: A schematic view of a message object according to the prior art;

FIG. 2: A schematic view of a message object comprising measurement data as part of the message object itself in accordance with an embodiment of the present invention;

FIG. 3: A distributed computing environment in accordance with an embodiment of the present invention;

FIG. 4: A schematic representation of measurement data in accordance with an embodiment of the present invention;

FIG. 5: A schematic view of an interface allowing the adding of components and measurement points in accordance with an embodiment of the present invention;

FIG. 6: A flowchart of a method in accordance with an embodiment of the present invention;

FIG. 7: A schematic view of a computing component in accordance with an exemplary usage scenario of an embodiment of the present invention;

FIG. 8: Exemplary measurement data strings in accordance with an embodiment of the present invention; and FIG. 9: An exemplary client/server scenario in accordance with an embodiment of the present invention.

5. DETAILED DESCRIPTION

Exemplary System Architecture

In the following, a presently preferred embodiment of the invention is described in the context of the distributed computing environment schematically shown in FIG. 3. As can be seen, the environment comprises a plurality of computing components 10, 15, 20, 25 and 30. In the example of FIG. 3, component 10 is a client communicating with component 30, which is a server. The communication between client 10 and server 30 is performed over an optional broker 20, which is in charge of dispatching messages between clients and servers. The computing components communicate by exchanging message objects 50 (cf. FIG. 2), as indicated by the arrows connecting the components.

As can also be seen in FIG. 3, each of the computing components in the distributed computing environment may comprise any number of measurement points M. A measurement point M may be understood as a location within the environment in which measurement or monitoring data 100 is collected in order to monitor the computing environment. As can be seen in FIG. 3, any computing component may via its measurement point(s) M collect measurement data 100. Measurement data 100 preferably comprises one or more key/value pairs that are component-specific, i.e. each computing component/measurement point M may collect the monitoring data 100 that it is interested in (cf. also FIG. 4).

Preferred Message Object Format

As noted above, a central aspect of the present invention is that the collected measurement or monitoring data 100 is not stored in a central location (as is conventional), but within the exchanged message object 50 itself. To this end, the message objects 50 are enhanced by a so-called message extension. With regard to FIG. 2, the skilled person will appreciate that the message object 50 shown therein is extended with such a message extension (labelled "LL, Payload Extension" in this example)—as compared to the conventional message object 50 shown in FIG. 1). FIGS. 1 and 2 also show further components of a typical message object 50, namely "SPFX" (an internal prefix for messages describing environment and structure), "LL" (which reflects the length of the message extension data), "ACI Key String" (a string describing the requested ACI command), "Binary Data" (an optional set of binary fields exchanged between stub and broker) and "ACI" (Advanced Communication Interface).

The message extension is the container of all monitoring and measurement data 100 created by the involved participants/components as the message object 50 is passed from the sending component to the recipient. The amount of data 100 may vary depending on the extent of monitoring and/or the number of involved participants/components. Hence, the message extension preferably has a variable length. Further, more than one message extension may be provided in a given message object 50 (for reasons explained in more detail further below).

The message extension is preferably a dedicated part or portion of the transferred message stream 50 and may be reserved exclusively for application monitoring and measurement data 100. All relevant monitoring data 100 of client 10, broker 20 (e.g. an EntireX Broker), server 30 and other components (e.g. a component using EntireX Broker as transport, like Natural RPC), are saved in the message extension. This approach in particular avoids extra effort for messages 50 sent asynchronously (i.e. adhering to the asynchronous messaging scheme), since no data has to be saved in extra data structures, nor transported over the network.

Compared to prior art solutions, the present invention thereby allows adding and examining the content of the measurement data 100 at any processing stage in any computing component of the distributed computing environment during the lifetime of a message 50.

Method

With reference to FIG. 6, a monitoring method in accordance with the present invention will be described. The method is preferably executed each time a given message object 50—on its path between the various computing components in the environment—arrives at a measurement point M (cf. FIG. 3). It should be appreciated that the following steps and their sequence constitute a preferred embodiment of the present method, but that certain steps might well be omitted or performed in a different sequence.

In step 1000, measurement data 100 already existing in the message extension of the message object 50 is extracted (if any such measurement data 100 is present). Such existing measurement data 100 may originate from a preceding computing component within the messaging chain. An extraction may be performed in order to facilitate certain computations on measurement data 100 (e.g. the calculation of time intervals).

In step 2000, data conversion may be performed. A conversion of the measurement data 100 extracted in step 1000 might be required, since the data 100 is typically collected by several computing components, which may be hosted on different heterogeneous platforms using different data formats (e.g. ASCII, EBCDIC, big/little endian formats, etc.). Furthermore, the data 100 is preferably converted into a printable format, which may require a translation into the correct code set. In this context, FIG. 4 shows an exemplary data format for measurement data 100.

In step 3000, the actual measurement takes place, i.e. the measurement and collection of the monitoring data 100 itself. If the monitoring involves time measurements, it is preferably performed in units of micro seconds. Depending on the respective component and/or platform, system calls, system API functions or store clock values may be used.

Step 4000 comprises any pre-calculations and/or computations (if necessary).

In step 5000, a further data conversion may be performed, e.g. to convert the resulting measurement value(s) 100 into a common printable format (cf. again FIG. 4 for an example measurement point M).

In step 6000, the measurement data 100 is eventually written, i.e. inserted in or appended to the message extension of the message object 50.

After the above steps have been performed by a given measurement point M, the message object 50 (now enriched by the collected measurement data 100) may be passed to the next measurement point M, which may be located in the same component or a different component within the distributed computing environment (cf. FIG. 1).

Finally, when the message object 50 reaches its so-called endpoint (i.e. the final recipient of the message), which is the client 10 in case of a synchronous call, the complete measurement data 100 contained in the message extension of the message object 50 is preferably sent to a data collector 40 (cf. FIG. 3). At the data collector 40, persistent messages may be saved in a persistent store, wherein the monitoring data 100 is saved there as well. Since the message extension containing the measurement data 100 represents a special property of the real message 50, both become an entity when sending messages 50 and/or saving them on a persistent store. Preferably, the persistent store belongs to broker 20 (e.g. as an attached database or file system, respectively). The persistence of a message is an important aspect of asynchronous message processing. Since the message object 50 and the measurement data 100 form an entity, the measurement of asynchronous messages can be simplified to a great extent. Further, it is important to note that when the message object 50 or the measurement data 100, respectively, is received by the data collector 40, all major calculations are already accomplished. This is because the calculations on the measurement data 100 have already been performed (in a step-wise manner) when the message object 50 passed through the various computing components and their measurement points M. As a result, no correlation and/or aggregation of the various measurement values 100 from several components are needed anymore, which makes the measurement data 100 usable for an evaluation tool (such as Optimize of applicant) with greatly improved efficiency.

Extensibility

In a preferred embodiment, the present invention also provides an interface (shown in FIG. 5) which allows services, servers and/or other computing components, respectively, to be easily added to the measurement data chain (i.e. to the path of components travelled by the message object 50) in order to do their own monitoring. This is a major advantage of the present invention, as the problem solved herewith cannot be handled by prior art solutions. For example, a given computing component (e.g. component "N" in FIG. 5) may use the provided interface to register a new measurement point M. Each time when a message object 50 passes the component, the component may then perform the desired measurement data 100 collection. In a preferred embodiment of the present invention, there is no fixed interface, due to the different requirements and/or programming languages used in the various computing components. Rather, a common basis for all computing components is the readable data stream (i.e. the message object 50) with its protocol specification (key value pairs; see further below), based on which different implementations are conceivable. In an exemplary embodiment involving a broker 20 and corresponding stubs 15 (cf. further below), these components are written in C and a framework is implemented comprising a library and certain macros that allow working with measuring points M on a more abstract level.

Exemplary Implementation

An exemplary implementation of the above concepts concerns a distributed computing environment run by EntireX of applicant. EntireX is primarily a so-called "enterprise application integration" (EAI) product that allows integration with legacy systems (mainframes), package systems (e.g. SAP) and/or Web services. For example, EntireX enables communication among applications running platforms in a heterogeneous network. In this context, again with reference to FIG. 3, the computing environment comprises an RPC client 10, an RPC server 30 and an EntireX Broker 20 therebetween. The EntireX Broker 20 is connected to the client 10 and the server 30 via respective broker stubs 25. A runtime 15 (which is the component managing RPC client calls) may also be provided between the client 10 and the broker stub 25.

In the above scenario, each client-server-message object 50 is enhanced by a so-called message extension (as explained further above). The monitoring and measurement data 100 thereby becomes a property of the message object 50 itself. The message object 50 is sent by the client 10 and while passing through EntireX Broker 20, server 30 and other components (like Natural RPC), and eventually back to the client 10, monitoring and measurement data 100 is collected at significant points (measurement points M; cf. FIG. 3). Measurement points M may not only collect measurement data

100 (e.g. delay-, transport-, retention times and/or other meaningful information) but may also perform pre-computations on the measurement data 100 before storing them into the message extension of the message object 50 (as described further above).

Further Use Cases

The message extension presented herein is not limited to the use for monitoring or measurement purposes, but also for various other scenarios where it is beneficial to store data in addition to the message payload. One example is to provide information about all components involved in the message flow in a distributed environment. Each component which is involved in the message processing and/or message forwarding may put a stamp, i.e. an additional data item, into the message extension. The stamp may identify the component's name, the version of the component and/or additional information such as the operating system name, version and/or hostname of the machine on which the component is running. Another example is that a component may add additional information to the message extension indicating the result of certain processing it has done (e.g. hire car reserved for 24 hrs) without changing the original message data (i.e. the payload). This could then result in modified behaviour of a subsequent component without the need for multiple round trips between the components. As a result, the present invention is not limited to monitoring message objects and/or computing components, but may also be employed in other contexts, such as the examples above. In this regard, the person skilled in the art will readily appreciate that a message object 50 may well comprise multiple message extensions, each probably serving a different use case.

Exemplary Usage Scenario

In the following, an exemplary usage scenario of an embodiment of the present invention will be described with reference to FIG. 7. As can be seen, computing component "X" comprises six measurement points M (labelled "MP_1", . . . , "MP_6" in FIG. 7). In addition, FIG. 7 shows four stages "A", "B", "C" and "D" to indicate the processing performed inside component X. Preferably, the current stage determines the measurement data processing, wherein the stage is part of the data stream itself. As already noted further above, the measurement data processing is component-specific. Due to possible time differences in heterogeneous environments and in order to achieve the desired preferred resolution in micro seconds, each component may perform its own pre-calculations (for example: elapsed time in component X minus queue wait times=(MP_6−MP_1)−(MP_5−MP_4)−(MP_3−MP_2), where MP_3−MP_2 is a wait time).

Measurement data 100 produced by the measurement point M preferably comprises comma-separated variable length key-value pairs. The complete string is preferably terminated by a null value (c-string). The key name preferably has a fixed length of 16 characters (bytes) with the following structure:

PPPCCCNNNNNNNNNX=<value>E wherein:

PPP=3 character product code
CCC=3 character component name
NNNNNNNNN=9 character item name
X=1 character type (T, M or S)
<value>=the data item belonging to the key
E=delimiter or terminator character Furthermore, the character types (T, M or S) are in this embodiment defined as:

T = fixed length (16 digits) time in micro seconds
 the value corresponds with the timval structure -continued

```
       only used inside components
       never send to Data Collector
M  =   variable length time in micro seconds
       relative time values
       calculated inside the component
S  =   variable length string
       contains additional data
       cannot contain    APPMON_SEPARATOR_CHR    '='
                         APPMON_DELIMITER_CHR    ','
                         APPMON_TERMINATOR_CHR   '\0'
```

Exemplary Measuring Data Stream:
EXXBRKCLIAPPNAMS=RPCClient, EXXBRKCLIHOSTNAS=DAEF, EXXBRKCLIUSERIDS=ERXUSER, EXXBRKAPPLINAMES=RPCApplication, EXXBRKCOLLECTORS=localhost:1234, EXXBRKAPPMSTAGES=CLIENTOUT, EXXSRVTIMESPROGM=32000, EXXSTBSERVERDURM=30719, EXXBRKCLIENTDURM=66339, EXXBRKSERVERDURM=36594, EXXBRKWAITSERVRM=12397, EXXBRKTIMBROKERM=17348, EXXSTBCLIENTDURM=70231

Exemplary Measurement Data Formats (cf. also FIG. 9):
EntireX Broker external key values

| | |
|---|---|
| EXXBRKWAITSERVRM | Time waiting for an available server (duration in Broker without service wait) |
| EXXBRKTIMBROKERM | Processing time in Broker (sum) |
| EXXBRKCLIENTDURM | Duration in Broker and server (incoming client call & reply) |
| EXXBRKSERVERDURM | Duration calling server (outgoing server call & reply) |
| EXXBRKAPPMSTAGES | Broker internal value representing the current monitor stage |
| EXXBRKCLIAPPNAMS | Client Application |
| EXXBRKCLIHOSTNAS | Client Host |
| EXXBRKCLIUSERIDS | Client User ID |
| EXXBRKAPPLINAMES | Application Name |
| EXXBRKCOLLECTORS | Collector Id, format host:port |

EntireX Broker internal key values

| | |
|---|---|
| EXXBRKINCOMINGRT | Broker incoming request, client or server |
| EXXBRKOUTGOINGRT | Broker outgoing request, client or server |
| EXXBRKCLIENTINCT | Client incoming |
| EXXBRKCLIENTOUTT | Client outgoing |
| EXXBRKSERVERWAIT | Service wait in |
| EXXBRKSERVERWAOT | Service wait out |
| EXXBRKSERVEROUTT | Server outgoing |
| EXXBRKSERVERINCT | Server incoming |

EntireX Broker Stub external key values (all stubs)

| | |
|---|---|
| EXXSTBCLIENTDURM | Duration from the stub to the Broker and back (client) |
| EXXSTBSERVERDURM | Duration from the stub to the Server and back (server) |

EntireX Broker Stub internal key values (only C stub)

| | |
|---|---|
| EXXSTBINCOMINGRT | Stub incoming request, client outgoing |
| EXXSTBOUTGOINGRT | Stub outgoing request, client or server |
| EXXSTBCLIENTCINT | Stub Client incoming |

-continued

| | |
|---|---|
| EXXSTBCLIENTOUTT | Stub Client outgoing |
| EXXSTBSERVERCINT | Stub Server incoming |
| EXXSTBSERVEROUTT | Stub Server outgoing |

All RPC Servers

| | |
|---|---|
| EXXSRVTIMESPROGM | Time spend in user (sub-)program |
| EXXSRVPROGMNAMES | RPC program name |
| EXXSRVCALLLENGTS | Length of RPC payload, request plus reply |

Natural RPC Server

| | |
|---|---|
| NATSRVADACMDTIMM | Adabas Command Time (sum) |
| NATSRVDBCALLTIMM | Elapsed Time spend for Database calls (sum) |
| NATSRVNUMDBCALLS | Number of Database calls |

All RPC Clients

| | |
|---|---|
| EXXCLIRESPONSETM | Roundtrip response time of the call |

FIG. 8 shows further examples of measurement data formats.

Exemplary Event Map Facts ("KPIs") and Their Calculation

ApplicationMonitoring
The identifier "Application Monitoring".
Comment: Created by the Data Collector
ApplicationName
The name of the application.
EntireX Measuring Point Key: EXXBRKAPPLINAMES
Comment: Provided by Broker and should be configurable. The default is the Service (e.g. RPC/SRV/CALLNAT)
AppMonClientApplication
The client application name as defined in the Broker control block (ANAME).
EntireX Measuring Point Key: EXXBRKCLIAPPNAMS
Comment: Provided by EntireX Broker.
AppMonClientHost
The client host name name as defined in the Broker control block (AHOST).
EntireX Measuring Point Key: EXXBRKCLIHOSTNAS
Comment: Provided by EntireX Broker.
AppMonClientUser
The client user ID.
EntireX Measuring Point Key: EXXBRKCLIUSERIDS
Comment: Provided by EntireX Broker.
AppMonDBCalls
The number of database calls (including system file calls, without Natural Security calls).
EntireX Measuring Point Key: NATSRVNUMDBCALLS
Comment: Provided by Natural RPC Server.
AppMonProgram
The program name.
EntireX Measuring Point Key: EXXSRVPROGMNAMES
Comment: Provided by the RPC Server.
AppMonRPCCallLength
The total length of the RPC call in bytes (request plus reply).
EntireX Measuring Point Key: EXXSRVCALLLENGTS
Comment: Provided by the RPC Server.
AppMonRPCRequests
The number of RPC requests. Always constant 1.
Comment: Created by the Data Collector
AppMonTimeAdabasCommand
The Adabas command time (taken from Adabas control block).
EntireX Measuring Point Key: NATSRVADACMDTIMM
Comment: Provided by Natural RPC Server.
AppMonTimeBroker
The time spent in the Broker (active processing).
EntireX Measuring Point Key: EXXBRKTIMBROKERM
Calculation: EXXBRKCLIENTDURM−EXXBRKSERVERDURM−EXXBRKWAITSERVRM
Comment: Calculation done by Broker.
AppMonTimeBrokerWaitForServer
The time spent in the Broker waiting for an available server.
EntireX Measuring Point Key: EXXBRKWAITSERVRM
Calculation: EXXBRKSERVERWAOT−EXXBRKSERVERWAIT
Comment: Calculation done by Broker.
AppMonTimeClientLayer
The time spent in the client RPC layer.
EntireX Measuring Point Key: none
Calculation: EXXCLIRESPONSETM−EXXSTBCLIENTDURM
Comment: Calculation done by the data collector.
AppMonTimeClientTransport
The transport time from the client to the Broker and back.
EntireX Measuring Point Key: none
Calculation: EXXSTBCLIENTDURM−EXXBRKCLIENTDURM
Comment: Calculation done by the data collector.
AppMonTimeDBCalls
The time spent for database calls.
EntireX Measuring Point Key: NATSRVDBCALLTIMM
Comment: Provided by Natural RPC Server.
AppMonTimeResponse
The complete response time (roundtrip from client to server and back).
EntireX Measuring Point Key: EXXCLIRESPONSETM
Comment: Calculation is done by RPC Client.
AppMonTimeServerLayer
The time spent in the server RPC layer (runtime and stub).
EntireX Measuring Point Key: none
Calculation: EXXSTBSERVERDURM−EXXSRVTIMESPROGM
Comment: Calculation done by the data collector.
AppMonTimeServerProgram
The time spent in the user program (called by the RPC server).
EntireX Measuring Point Key: EXXSRVTIMESPROGM
Comment: Calculation is done by the RPC Server.
AppMonTimeServerTransport
The transport time from the Broker to the server and back.
EntireX Measuring Point Key:
Calculation: EXXBRKSERVERDURM−EXXSTBSERVERDURM
Comment: Calculation done by the data collector.

It will be appreciated that as used herein, the terms system, subsystem, server, client, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate non-transitory tangible computer readable storage medium. It also will be appreciated that the techniques described herein may be accomplished by having at least one processor execute instructions that may be tangibly stored on a non-transitory computer readable storage medium. Thus, for example, the systems of certain example embodiments may include, for instance, processing resources comprising at least one processor, a memory, etc. Similar statements apply with respect to the clients, servers, and/or other elements in the various networks discussed herein.

What is claimed is:

1. A method of monitoring a message object sent from a client to invoke an operation on a server in a distributed computing environment, the method comprising:
 having at least one registered dynamic measurement point in the distributed computing environment, the at least one registered dynamic measurement point having been registered in response to instructions from an interface;
 collecting data about a computing environment at the at least one registered measurement point in a component of the distributed computing environment;
 upon receipt of the message object at the at least one registered measurement point, extracting measurement data from the message object;
 converting the extracted measurement data into a data format associated with the at least one registered measurement point;
 performing, at the component including the at least one registered measurement point, a computation using the converted extracted measurement data and the collected data at the at least one registered measurement point;
 producing, at the component including the at least one registered measurement point, measurement data based at least in part on the computation using the converted extracted measurement data and the collected data at the at least one registered measurement point, the produced measurement data including a plurality of measurement values and identification information for each measurement value, the identification information identifying the component including the at least one registered measurement point;
 inserting the produced measurement data into the message object; and
 forwarding the message object including the produced measurement data in the distributed computing environment in invoking the operation on the server.

2. The method of claim 1, wherein the produced measurement data comprises information about a delay time, transport time and/or retention time of the message object.

3. The method of claim 1, wherein the inserting comprises appending the measurement data, produced based at least in part on the computation using the extracted measurement data, to measurement data that already exists in the message object.

4. The method of claim 1, wherein the message object comprises at least one message extension in which the measurement data is inserted, the at least one message extension being separate from a payload of the message object.

5. The method of claim 1, wherein the producing of measurement data comprises using the extracted measurement data to produce a time interval.

6. The method of claim 1, further comprising:
 receiving the message object at a message endpoint; and
 sending the measurement data comprised in the message object to a data collector.

7. The method of claim 1, wherein the message object is passed between at least one client and at least one server over at least one broker in the distributed computing environment; and wherein the at least one client, the at least one server and/or the at least one broker comprises at least one respective registered measurement point for producing measurement data.

8. A non-transitory computer readable storage medium tangibly storing a computer program comprising instructions for implementing a method according to claim 1.

9. A system for monitoring a message object sent from a client to invoke an operation on a server in a distributed computing environment, wherein the system comprises:
 processing resources including a computer processor and a memory; and
 at least one registered dynamic measurement point in the distributed computing environment, registered in response to instructions from an interface, controlled by the processing resources, and configured to:
 collect data about a computing environment at the at least one measurement point in a component of the distributed computing environment;
 receive the message object at the at least one registered measurement point,
 extract measurement data from the message object,
 convert the extracted measurement data into a data format associated with the at least one registered measurement point;
 performing, at the component including the at least one registered measurement point, a computation using the converted extracted measurement data and the collected data at the at least one registered measurement point,
 produce, at the component including the at least one registered measurement point, measurement data based at least in part on the computation using the converted extracted measurement data and the collected data at the at least one registered measurement point, the produced measurement data including a plurality of measurement values and identification information for each measurement value, the identification information identifying the component including the at least one registered measurement point,
 insert the produced measurement data into the message object, and
 forward the message object including the produced measurement data in the distributed computing environment in invoking the operation on the server.

10. The system of claim 9, wherein the at least one registered measurement point is configured to produce measurement data comprising information about a delay time, transport time and/or retention time of the message object.

11. The system of claim 9, wherein the at least one registered measurement point is configured to append the measurement data to measurement data that already exists in the message object.

12. The system of claim 9, wherein the message object comprises at least one message extension in which the measurement data is inserted, the at least one message extension being separate from a payload of the message object.

13. The system of claim 9, wherein the producing measurement data includes using the extracted measurement data to produce a time interval.

14. The system of claim 9, wherein the system further comprises a message endpoint configured to:
 receive the message object; and
 send the measurement data comprised in the message object to a data collector.

15. The system of claim 9, wherein the system further comprises at least one client, at least one server and at least one broker between which the message object is passed;

wherein the at least one client, the at least one server and/or the at least one broker comprise at least one respective registered measurement point for producing measurement data.

16. The method of claim 1, wherein registered measurement points are provided to a plurality of computing components of different respective types provided in a heterogeneous network.

17. The method of claim 1, further comprising converting the produced measurement data into a predefined data format.

18. The method of claim 17, wherein the predefined data format is a common printable format.

19. The method of claim 1, further comprising inserting into the message object additional data including a version of the component including the at least one registered measurement point, and/or operating system information on which the component is running.

20. The method of claim 1, wherein:
the message object is received from a preceding measurement point and includes results of a computation performed by the preceding measurement point; and
the computation using the extracted measurement data is performed based at least in part on the results of the computation performed by the preceding measurement point.

21. The method of claim 1, wherein the produced measurement data comprises a plurality of key-value pairs, the key of the key-value pair including the identification information and the value of the key-value pair including the measurement value.

22. The method of claim 1, wherein the produced measurement data is inserted into the message object without modifying the extracted measurement data.

23. The method of claim 1, further comprising:
receiving the message object at a message endpoint, the message object including measurement data produced at each of the measurement points; and
sending the measurement data comprised in the message object to a data collector.

24. The method of claim 1, further comprising modifying a behavior of a component including the at least one registered measurement point in response to the computation using the extracted measurement data.

25. The method of claim 1,
wherein the measurement data produced based at least in part on the computation is converted back into a format of the message object before being inserted into the message object.

26. The method of claim 1, wherein the produced measurement data includes a measurement value produced based on the computation using the extracted measurement data, and a measurement value produced at the at least one registered measurement point based on a computation not using the extracted measurement data.

27. The method of claim 1, wherein the identification information further comprises a version of the component and operating system of a machine on which the component is running.

* * * * *